United States Patent Office 3,219,637
Patented Nov. 23, 1965

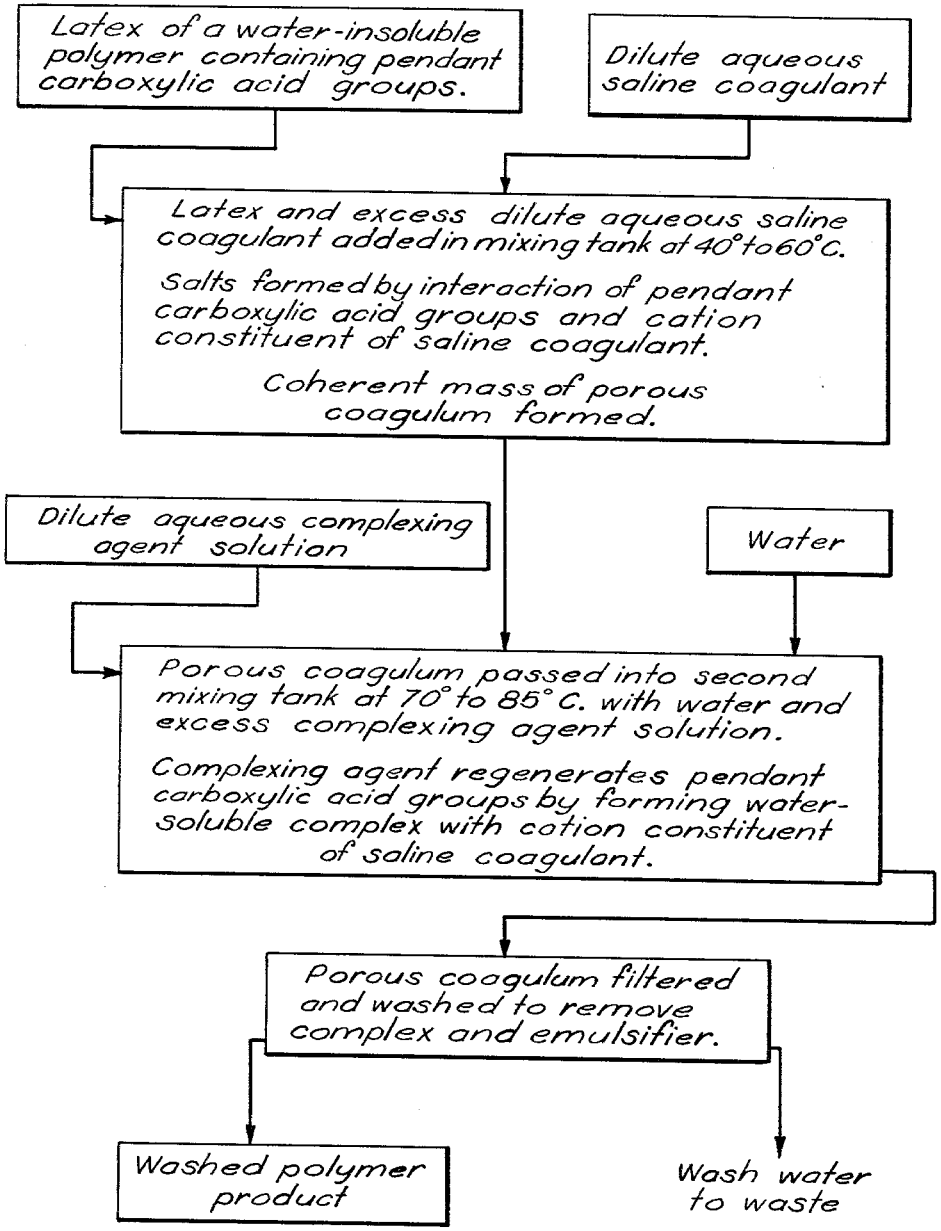

3,219,637
COAGULATION AND WASHING OF WATER-INSOLUBLE POLYMERIC MATERIALS CONTAINING PENDANT CARBOXYLIC ACID GROUPS
Jack F. Stabler, Louis C. Friedrich, and Merritt Meeks, Midland, Mich., assignors to The Dow Chemical Company, Midland, Mich., a corporation of Delaware
Filed Sept. 20, 1962, Ser. No. 225,032
4 Claims. (Cl. 260—78.5)

This invention relates to an improved method for coagulating and washing water-insoluble polymeric materials when produced in the form of aqueous latex-like emulsions or dispersions, and particularly such water-insoluble materials which contain pendant carboxylic acid groups.

Many polymeric materials are commonly prepared by emulsifying their corresponding water-insoluble monomers, adding a catalyst to the emulsion, and subjecting the emulsion to a temperature known to induce polymerization of the monomer. The product thus comprises a colloidal dispersion of fine particles of the polymer in water. For the purpose of separating the disperse phase from the continuous phase in latices, the latex is generally mixed with a saline solution which acts as a coagulant.

When such polymeric materials, particularly vinylidene chloride polymers, are produced in aqueous emulsion, it has been found extremely difficult to free the polymer, after coagulation, from the electrolyte used to coagulate the emulsion, and from other impurities. The coagulum is often slimy or pasty, and impurities which should be soluble in water are held tenaciously by the coagulum. Such a mass cannot be washed free of electrolyte and remaining emulsifier and, when dried for use in molding, coating, or extrusion operations, shows evidence of the impurities in the inferior properties of the so-formed articles. The problem is particularly troublesome when polymers containing pendant carboxylic acid groups are prepared by emulsion polymerization and coagulated by saline coagulants, as the cationic constituent of such saline coagulants readily forms salts with such pendant carboxylic acid groups. Such salts are generally insoluble in lacquer solutions generally used to cast films and coatings for films from such polymeric materials, and additionally, drastically reduce the ability of such polymeric coating materials to adhere to a base film such as regenerated cellulose and the like.

It is an object of the invention to provide an improved process for coagulating water-insoluble polymeric materials, and particularly those water-insoluble polymeric materials containing pendant carboxylic acid groups, in which the coagulum is obtained in a condition in which it may be washed easily to effect complete removal of the coagulating electrolyte and emulsifier.

The process of the invention is illustrated diagrammatically in the annexed drawing.

The objects of the invention may be readily accomplished by (1) admixing in a first mixing tank a latex-like dispersion of a water-insoluble polymeric material, particularly those water-insoluble polymeric materials containing pendant carboxylic acid groups, with an excess of an aqueous saline coagulant at a temperature between about 40° and 60° C. to form a coherent mass of coagulum; (2) passing said coagulum into a second mixing tank maintained at a temperature between about 70° and 85° C. in confluence with an aqueous solution of a complexing agent for such coagulant to form a water-soluble complex of such complexing agent and the cationic constituent of such coagulant; and (3) filtering and washing the coagulum with water to remove the so-formed complex and emulsifier.

The term, "water-insoluble polymeric material," as herein used is intended to designate the polymers of vinylidene chloride, vinyl chloride, vinyl acetate, acrylonitrile, styrene, methyl methacrylate, and the like, and their interpolymers with some of these or other polymerizable monoethylenically unsaturated materials. Polymers which particularly benefit from the process of the present invention include those vinylidene chloride polymers containing pendant carboxylic acid groups which are especially useful for forming well adhered moistureproof, heat-sealable, transparent coatings for base films such as regenerated cellulose film, paper, and the like. As exemplary of such polymers are those interpolymers resulting from the copolymerization of (a) vinylidene chloride; (b) one or more monomeric ethylenic acidic compounds such as citraconic acid or its anhydride, mesaconic acid, itaconic acid or its anhydride, acrylic acid, methacrylic acid, butacrylic acid, or maleic acid or its anhydride among others; and, (c) one or more monoethylenically unsaturated comonomeric compounds such as acrylonitrile, alkyl esters of acrylic and methacrylic acids having from about 1 to 18 carbon atoms in the alkyl group (e.g., methyl methacrylate, ethyl methacrylate, butyl methacrylate, octyl methacrylate, n-dodecyl methacrylate, n-octadecyl methacrylate, methyl acrylate, ethyl acrylate, propyl acrylate, butyl acrylate, etc.), phenyl methacrylate, cyclohexyl methacrylate, p-cyclohexylphenyl methacrylate, methacrylonitrile, methylvinyl ketone, and vinyl chloride.

Polymers in which the relative proportions of such comonomeric materials are in the order of about 35 to 96.9 percent by weight vinylidene chloride; 0.1 to 25 percent by weight of one or more monomeric ethylenic acidic compounds, particularly itaconic acid; and complementarily from 3 percent to 40 percent by weight of one or more monoethylenically unsaturated comonomeric compounds, particularly acrylonitrile, are extensively used in coating applications and benefit greatly by application of the process of the present invention.

Solutions of bivalent and trivalent metal salts such as calcium chloride, magnesium chloride, calcium nitrate, aluminum sulphate, barium chloride, and aluminum chloride, have been found to be effective coagulants, with aluminum salts generally being preferred. As indicated, dilute aqueous saline coagulant solutions are employed. The term dilute is intended to imply that the concentration of the coagulant substance in the aqueous medium is generally below about 15 percent by weight and often from between about 1 to 2 percent by weight.

It has been found that the particle size of the water-insoluble polymers described herein is dependent upon the coagulation temperature. Thus, the most advantageous results are obtained when such polymer is stirred, simultaneously, with a dilute aqueous coagulant solution in a mixing tank maintained at a temperature of at least about 20° C. and preferably between about 40° and 60° C. to form a coherent mass of coagulum. During this mixing period it has been observed that the pendant carboxylic acid groups provided by the ethylenic acidic constituent of such polymeric material reacts with the cationic constituent of the saline coagulant to form a salt therewith.

The coagulum is then advantageously passed into a second mixing tank in confluence with a dilute aqueous solution of a complexing agent for such cationic constituent of the saline coagulant, such complexing agent being present in at least stoichiometric amounts based on the amounts of saline coagulants employed.

Suitable complexing agents are advantageously selected from the group consisting of beta and gamma hydroxy substituted carboxylic acids capable of forming a water-soluble complex with the cationic constituent of the saline coagulant. Exemplary of such materials are, citric acid, malic acid, and the like.

Additional amounts of water are often added in confluence with such coagulum to the second mixing tank to aid in ease of agitation and mixing of such coagulum with the dilute aqueous solution of complexing agent. The admixture is generally advantageously admixed for a period of between about 5 and 30 minutes at a temperature of at least about 50° C. and preferably between about 70° and 85° C. until the complexing agent has formed a water-soluble complex with the cationic constituent of the saline coagulant, and has further regenerated the pendant carboxylic acid groups of the water-insoluble polymeric material. Thus, it is a requirement of the present invention that the complexing agent be present in at least stoichiometric amounts based on the amounts of coagulant employed for obtainment of optimum benefits derived from the process of the present invention.

Following formation of the water-soluble complex described herein, the product can be readily obtained by filtering or centrifuging the same and water washing the water-insoluble polymers to remove water-soluble complex and emulsifier.

It is to be understood that the composition, concentration, and rates of addition of the latex, and aqueous solutions of coagulant and complexing agent, as well as the relative sizes and types of the equipment used for transferring, mixing, filtering, and washing such materials may be varied widely to produce the most desirable and beneficial results. Thus, such process may be employed either batchwise or continuously.

It is also to be understood that the polymeric compositions as described herein may suitably contain conventional dyes, pigments, light and heat stabilizers, etc., as necessary or desired for particular applications without affecting the desirable properties of the material treated by the process of this invention.

The following example, wherein all parts and percentages are to be taken by weight, illustrates the present invention but is not to be construed as limiting its scope.

*Example*

In each of a series of experiments, a latex containing 30 percent solids of a crystalline terpolymer composed of 91.5 percent by weight vinylidene chloride, 8 percent acrylonitrile, and 0.5 percent itaconic acid was prepared by emulsion polymerization, utilizing potassium persulfate as the catalyst and the dihexyl ester of the sodium salt of sulfosuccinic acid as the emulsifier in a manner well known in the art.

The so-formed latices were individually, continuously coagulated by pumping each latex into an 80 gallon mixing tank maintianed at a temperature of between 40° and 60° C., through a small orifice at a rate between about 7 and 12 gallons per minute, while simultaneously pumping through a second orifice between about 0.4 and 0.5 gallon per minute of a 10 to 15 percent aqueous solution of alum in confluence with 20 to 40 gallons per minute of water. The mixture was thereafter agitated and driven to the bottom of the mixing tank by a suitable baffle arrangement and subsequently directed upwardly through an overflow valve into a second mixing tank, during which operation the hold-up time in the first mixing tank was generally between about 2 and 4 minutes. In each case, such procedure was sufficient to form a coherent mass of porous coagulum. Such coagulum contained in aqueous coagulant dispersion was continuously passed from the over-flow of the first mixing tank into a second 2,000 gallon mixing tank maintained at a temperature of between 70° and 85° C., such dispersion being added simultaneously with a 15 percent aqueous solution of citric acid introduced at a rate of about 0.4 to 0.5 gallon per minute and, additionally, in confluence with between 10 and 35 gallons per minute of pure water. Residence time in the second mixing tank varied inversely with the amount of water used; however, such residence time generally ranged between 5 and 30 minutes. The resultant treated coagulant in aqueous dispersion was then continuously filtered and water washed to remove water-soluble complex materials and remaining emulsifier, and subsequently dried in an air oven at 50° C.

As evidence of the improvement in the polymer products when coagulated as described above, organic solvent lacquer coating solutions comprised of 25 percent by weight of the dried coagulates dissolved in a mixture of about 35 parts by weight toluene and about 65 parts by weight tetrahydrofuran were prepared and cast as coatings on thin films of regenerated cellulose. In each instance, the coating solutions contained no observable insoluble material and the coating produced therefrom adhered tenaciously to the base film. Additionally, no adverse effects regarding clarity, heat-sealability, or moisture vapor impermeability were observed in the coating prepared from the polymeric material treated by the process of the present invention.

By way of contrast, a fresh sample of the latex as described herein was coagulated in a similar aqueous alum coagulating solution, and the resulting coagulum subsequently washed on a filter with water, and, after drying, was used to prepare a lacquer coating solution as described herein. Such lacquer coating solution contained considerable insoluble material and, when cast as a coating on a base film of regenerated cellulose, had noticeably less adhesion to such film. Such insoluble impurities of the lacquer coating solution were determined to be caused by the presence of aluminum salts of the pendant carboxylic acid groups of the polymeric constituent of the latex which were formed during the coagulation procedure. Failure to regenerate such free carboxylic acid groups noticeably reduces the desirable and advantageous adhesive properties of coatings prepared from such polymeric materials, the adhesive properties of such coatings being attributed to the presence of unreacted carboxyl groups of the polymer.

Similar good results were obtained wherein any water-insoluble polymeric material containing pendant carboxylic acid groups is coagulated by the process of the present invention. The invention is particularly useful for those polymeric materials comprising (a) from 35 to 96.9 percent by weight of vinylidene chloride; (b) 0.1 to 25 percent by weight of one or more monomeric ethylenic acidic compounds as described herein, particularly itaconic acid; and, (c) from 3 to 40 percent by weight of one or more monoethylenically unsaturated comonomer compounds as described herein.

What is claimed is:

1. In the process which comprises the sequential steps of coagulating a latex-like dispersion of a water-insoluble polymer prepared by polymerization of an admixture of monomeric constituents and containing carboxylic acid groups, by contacting said polymer with an excess of an inorganic salt of a polyvalent metal cation selected from the group consisting of aluminum and the Group II–A metals of the periodic system according to Mendeleev to form an aqueous dispersion of coagulum containing salts of said cation and said carboxylic acid groups and thereafter washing said coagulum with water to remove water-soluble impurities, the improvement consisting of: contacting said aqueous dispersion of coagulum prior to finally washing the same with water with at least stoichiometric amounts of citric acid based on the amounts of said inorganic salt while maintaining said aqueous dispersion at a temperature between about 70° C. and 85° C. until said carboxylic acid groups are regenerated.

2. The process of claim 1 wherein said inorganic salt is alum.

3. The process of claim 2 wherein said water-insoluble polymer is a vinylidene chloride polymer.

4. The process of claim 3 wherein said water-insoluble polymer is a terpolymer of about 91.5 percent by weight vinylidene chloride, 8 percent by weight acrylonitrile and 0.5 percent by weight of itaconic acid.

References Cited by the Examiner

UNITED STATES PATENTS

| | | | |
|---|---|---|---|
| 2,667,522 | 1/1954 | McElroy | 260—814 |
| 2,697,700 | 12/1954 | Uraneck et al. | 260—80 |
| 2,953,554 | 9/1960 | Miller | 260—94.3 |
| 2,961,340 | 11/1960 | Meier | 260—29.6 |
| 3,057,811 | 10/1962 | Trachtenberg et al. | 260—29.6 |

JOSEPH L. SCHOFER, *Primary Examiner.*

DONALD E. CZAJA, *Examiner.*